(12) United States Patent
Wright et al.

(10) Patent No.: US 9,638,083 B2
(45) Date of Patent: May 2, 2017

(54) CONNECTOR ELEMENT

(75) Inventors: Keith E. Wright, Chatham (GB); Frank Grumbrecht, Berlin (DE)

(73) Assignee: Delphi International Operations Luxembourg SARL., Luxembourg (LU)

( * ) Notice: Subject to any disclaimer, the term of this patent is extended or adjusted under 35 U.S.C. 154(b) by 346 days.

(21) Appl. No.: 14/007,151

(22) PCT Filed: Apr. 5, 2012

(86) PCT No.: PCT/EP2012/056326
§ 371 (c)(1),
(2), (4) Date: Sep. 24, 2013

(87) PCT Pub. No.: WO2012/136789
PCT Pub. Date: Oct. 11, 2012

(65) Prior Publication Data
US 2014/0014204 A1    Jan. 16, 2014

(30) Foreign Application Priority Data

Apr. 7, 2011 (GB) .................................. 1105884.9

(51) Int. Cl.
*F01N 3/24* (2006.01)
*F16L 53/00* (2006.01)

(52) U.S. Cl.
CPC .............. *F01N 3/24* (2013.01); *F16L 53/00* (2013.01); *Y10T 137/87153* (2015.04)

(58) Field of Classification Search
CPC ...... F01N 2240/02; F01N 3/043; F01N 13/14; F01P 2060/16

USPC ................................... 60/273, 274, 295, 320
See application file for complete search history.

(56) References Cited

U.S. PATENT DOCUMENTS

| | | | |
|---|---|---|---|
| RE25,858 E | * | 9/1965 | Matvay ..................... H05H 1/42 219/75 |
| 5,658,265 A | | 8/1997 | Hiruta |
| 5,908,020 A | | 6/1999 | Boutell et al. |
| 6,526,746 B1 | * | 3/2003 | Wu ........................ F01N 3/2066 239/585.1 |

(Continued)

FOREIGN PATENT DOCUMENTS

DE          3815608 A1 * 12/1988  ............. F02M 31/16
DE   10 2007 061 177 A1    6/2009

(Continued)

OTHER PUBLICATIONS

Machine Translation of DE-102007061177, Translated on Sep. 16, 2015.*
International Search Report dated Jun. 29, 2012.

*Primary Examiner* — Patrick Maines
(74) *Attorney, Agent, or Firm* — Joshua M. Haines

(57) ABSTRACT

A connector element for connecting a pump assembly for use in a selective catalytic reduction system to a reagent supply of reagent fluid, the connector element comprising: a reagent flow passage arranged to receive reagent fluid at a first end from the reagent supply and to supply the reagent fluid via a second end to a reagent inlet port for reagent fluid on the pump assembly; a coolant passage for cooling fluid, the coolant passage arranged to be in communication with a coolant port on the pump assembly.

17 Claims, 10 Drawing Sheets

(56) References Cited

U.S. PATENT DOCUMENTS

| | | | |
|---|---|---|---|
| 7,762,061 B2 * | 7/2010 | Birkby | F01N 3/0253 |
| | | | 222/145.5 |
| 7,895,829 B2 | 3/2011 | Suzuki et al. | |
| 8,205,667 B2 | 6/2012 | Yoshino | |
| 2008/0029655 A1 | 2/2008 | Mabuchi et al. | |
| 2009/0301064 A1 * | 12/2009 | Maier | F01N 3/2066 |
| | | | 60/286 |
| 2009/0301067 A1 | 12/2009 | Dingle et al. | |
| 2011/0309166 A1 * | 12/2011 | Thomas | F01N 3/2066 |
| | | | 239/585.1 |
| 2012/0144814 A1 * | 6/2012 | Won | F01M 5/001 |
| | | | 60/320 |

FOREIGN PATENT DOCUMENTS

| | | | | |
|---|---|---|---|---|
| DE | 102007061177 A1 * | 6/2009 | | E03F 1/00 |
| EP | 0 688 993 A1 | 12/1995 | | |
| EP | 1 878 920 A1 | 1/2008 | | |
| EP | 2647803 A1 * | 10/2013 | | |
| JP | 5-31872 | 4/1993 | | |
| JP | 2007 224816 A | 9/2007 | | |
| JP | 2009 57863 A | 3/2009 | | |
| JP | 2009 243279 A | 10/2009 | | |

* cited by examiner

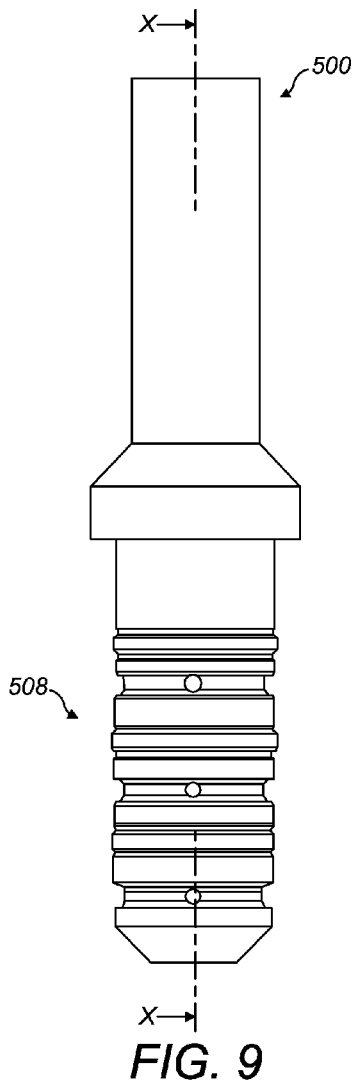
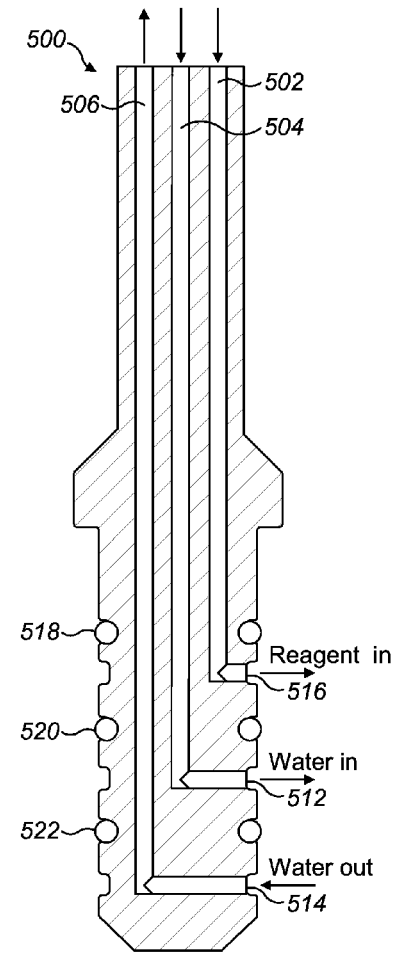
FIG. 9
FIG. 10

CONNECTOR ELEMENT

CROSS REFERENCE TO RELATED APPLICATIONS

This application is a national stage application under 35 U.S.C. 371 of PCT Application No. PCT/EP2012/056326 having an international filing date of Apr. 5, 2012, which designated the United States, which PCT application claimed the benefit of Great Britain Patent Application No. 1105884.9 filed Apr. 7, 2011, the entire disclosure of each of which are hereby incorporated herein by reference.

FIELD OF THE INVENTION

The present invention relates to a connector element. In particular, but not exclusively, the present invention relates to connector arrangements for dosing pump assemblies for use in a selective catalytic reduction system with cooling/heat exchange arrangements.

BACKGROUND TO THE INVENTION

It is known that exhaust gases from internal combustion engines contain substances which are harmful to the environment and which can pose a threat to public health. For many years, a sustained effort has been made within the automotive industry to reduce the release to the atmosphere of harmful substances carried in exhaust gases, both by modifying the combustion process itself to give a reduced yield of harmful combustion products, and by treating the exhaust gases before their emission into the atmosphere, for example by providing a catalyst to induce chemical breakdown of the harmful constituents, particularly the oxides of nitrogen ($NO_x$), into benign compounds.

One strategy for reducing $NO_x$ emissions, known as selective catalytic reduction or SCR, involves the introduction of a reagent comprising a reducing agent, typically a liquid ammonia source such as an aqueous urea solution, into the exhaust gas stream. The reducing agent is injected into the exhaust gas upstream of an exhaust gas catalyst, known as an SCR catalyst, typically comprising a mixture of catalyst powders such as titanium oxide, vanadium oxide and tungsten oxide immobilised on a ceramic honeycomb structure. Nitrogen oxides in the exhaust gas undergo a catalysed reduction reaction with the ammonia source on the SCR catalyst, forming gaseous nitrogen and water. An example of an SCR system is described in the Applicant's European Patent Application Publication No. EP-A-2131020, the contents of which are hereby incorporated by reference.

SCR systems typically include a reagent dosing pump assembly for delivering reagent to the exhaust gas stream. Examples of such pumps are described in the Applicant's European Patent Application Publication No. EP-A-1878920, the contents of which are hereby incorporated by reference.

In one known reagent pump assembly, a solenoid-actuated pumping arrangement is provided to increase the pressure of the reagent, and the pump includes an atomising nozzle that receives the reagent from the pumping arrangement and delivers it from an outlet end into the exhaust gas stream. The nozzle is close-coupled to the pumping arrangement, so that the nozzle and the pumping arrangement form a single unit. The outlet end of the nozzle may be positioned directly in the exhaust gas stream, so that the pumping arrangement is located close to the outside of the exhaust pipe that conveys the exhaust gases.

It will be appreciated that, in such a case, the reagent dosing pump is exposed to the high temperatures that arise in the vicinity of the exhaust system, and so the reagent can be subjected to high temperatures, in use.

The maximum temperature at which urea-based reducing agents can be used is somewhat limited. Urea crystals tend to precipitate when the temperature of the solution is greater than approximately 70° C. Precipitation is undesirable because the precipitates can cause blockages in the delivery system, for example in the small-diameter outlets typically provided in the outlet end of the atomising nozzle. In addition, the formation of precipitates alters the concentration of the remaining solution, so that the effective quantity of ammonia delivered to the exhaust flow becomes uncertain. This could lead to inefficient catalysis and an insufficient reduction in NO emissions.

It is therefore desirable, in many cases, to provide cooling means to cool the reagent in an SCR system and, in particular, in the reagent dosing pump, to prevent overheating of the reagent. Furthermore, when solenoid-actuated pumping arrangements are used, it is also desirable to cool the solenoid coil since the performance of solenoid actuators can decrease at high temperatures.

In some arrangements, the reagent dosing pump of an SCR system may be mounted on the exhaust pipe under the body of a vehicle. Some cooling of the exhaust gases occurs as the gases flow from the engine to the location of the reagent dosing pump, which limits to a degree the temperature to which the reagent dosing pump, and hence the reagent, is exposed. In such arrangements, sufficient cooling of the reagent dosing pump may be possible by virtue of the cooling air-flow around the reagent dosing pump, and/or by providing suitable insulating means to reduce heat transfer from the exhaust pipe to the regent dosing pump.

In other arrangements, it is desirable to locate the reagent dosing pump in the engine compartment of the vehicle. In these cases, the reagent dosing pump is exposed to higher temperatures, due to the closer proximity of the dosing pump to the engine, and it is more difficult to provide a cooling air flow to the reagent dosing pump. Accordingly, the risk of the reagent overheating in use is higher than in an under-body arrangement.

The latest SCR reagent dosing systems (herein referred to as a "doser") require a coolant supply, a coolant outlet, and a reagent inlet (to the dosing system pump assembly) to be provided. Reagent in such dosing systems is transported to the doser via a pipe.

As noted above, due to high ambient temperature environments (for example within the engine bay near exhaust manifold) near and at the doser, the reagent feed pipe needs to be protected from heat to avoid boiling of the reagent. An additional and more extreme heating effect may also occur after ignition off (i.e. on engine shut down or during periods when the engine may be off such as in a Start-Stop energy efficient engine system), when coolant flow ceases and the heat soak effect from the nearby exhaust manifold and engine block means there is a large heat source. Additionally, in some environments (e.g. in northern latitudes) low ambient temperatures may be experienced requiring that the reagent pipe be protected from the cold and ideally provided with heat energy in the event that the reagent is frozen.

In known systems, connection of the two inlets (coolant fluid inlet and reagent fluid inlet) and one outlet (coolant fluid outlet) to the pump assembly have been by relatively large individual connectors. This represents a relatively bulky solution which may be incompatible with the production environment which can be tight and compact and subject to space constraints. Given such a lack of space, it can be difficult to screw individual connectors to the doser in a production embodiment (e.g. during manufacture or during in-service maintenance). Connectors can also be pressed or fitted by other suitable means.

It is therefore an object of the present invention to provide a connector element for connecting a pump assembly for use in a selective catalytic reduction system to a reagent supply of reagent fluid that overcomes or substantially mitigates the above mentioned problems.

SUMMARY OF THE INVENTION

According to a first aspect of the present invention there is provided a connector element for connecting a pump assembly for use in a selective catalytic reduction system to a reagent supply of reagent fluid, the connector element comprising: a reagent flow passage arranged to receive reagent fluid at a first end from the reagent supply and to supply the reagent fluid via a second end to a reagent inlet port for reagent fluid on the pump assembly; a coolant passage for cooling fluid, the coolant passage arranged to be in communication with a coolant port on the pump assembly.

The present invention provides a connector element that may be attached to a fluid-cooled pump assembly to provide a connection means for connecting a reagent supply and a coolant supply or coolant drain to the pump assembly.

A reagent supply passage/flow passage is provided within the connector along with a coolant passage that may be used to either supply coolant fluid to the pump assembly or for returning coolant fluid from the pump assembly to a coolant drain. The connector element may conveniently comprise a reagent flow passage and two coolant passages, one for supply of coolant fluid to the pump assembly and one for returning coolant fluid from the pump assembly. The provision of two or more fluid flow passages within the connector element enables fluid supply pipes and heat exchanger pipes to be more easily connected to the pump assembly which may be relatively small compared to the size of the incoming and outgoing fluid supply lines.

Conveniently, the coolant passage may be disposed around the reagent flow passage to provide a heat exchange arrangement for cooling the reagent fluid within the reagent flow passage. The coolant passage may be in a helical arrangement around the reagent flow passage.

Alternatively, the coolant passage may be defined, in part, by a jacket which encloses at least a part of the length of the reagent flow passage. The connector element may comprise a flow guide disposed between the jacket and the reagent flow passage. Conveniently, the coolant passage may comprise a first compartment for cooling fluid defined in part by the flow guide and in part by the jacket, the first compartment being in fluid communication with a first port; and a second compartment for cooling fluid defined in part by the flow guide and in part by the reagent flow passage, the second compartment being in fluid communication with a second port wherein the second compartment is in fluid communication with the first port by way of the first compartment.

The connector element may define a connector axis (X) and the connector element may be arranged such that, in use, cooling fluid flows through the first compartment in a first direction generally parallel to the connector axis (X), and through the second compartment in a second direction generally opposite to the first direction.

Conveniently, the first port may be an inlet port for cooling fluid into the connector element and the second port may be an outlet port for supply of the cooling fluid into a coolant passage within the pump assembly. Alternatively, the first port may be an outlet port for cooling fluid from the connector element and the second port may be an inlet port for cooling fluid from within the pump assembly to the connector element.

The coolant port on the pump assembly may be a coolant inlet port for receiving cooling fluid and the coolant passage may be in communication with the coolant inlet port. Alternatively, the coolant port on the pump assembly may be a coolant outlet port and the coolant passage may be in communication with the coolant outlet port. Preferably, the coolant passage may comprise a microbore within the connector element.

The connector element may conveniently further comprise a further coolant passage, the coolant passage being in fluid communication with a coolant inlet port on the pump assembly for receiving cooling fluid and the further coolant passage being in fluid communication with a coolant outlet port for cooling fluid leaving the pump assembly. In such arrangement, each coolant passage may comprise a microbore within the connector element.

In connector elements where the reagent passage comprises a microbore, each microbore within the connector element may be formed into an L shape. The connector element may define an axis (X) and the L shaped microbores may be arranged such that fluid flow between the connector element and the pump assembly is perpendicular to the connector axis and wherein fluid flow from the reagent supply and from a coolant supply and to a coolant drain is in a direction parallel to the connector axis.

The connector element may be formed from a block of generally cuboidal shape, the reagent passage and coolant passage being formed as drillings through the block.

BRIEF DESCRIPTION OF THE DRAWINGS

Embodiments of the present invention will now be described, by way of example only, with reference to the accompanying drawings, in which like reference numerals are used for like parts, and in which:

FIGS. 9 and 10 show a connector element in accordance with a third embodiment of the present invention;

DETAILED DESCRIPTION

Figure 1:
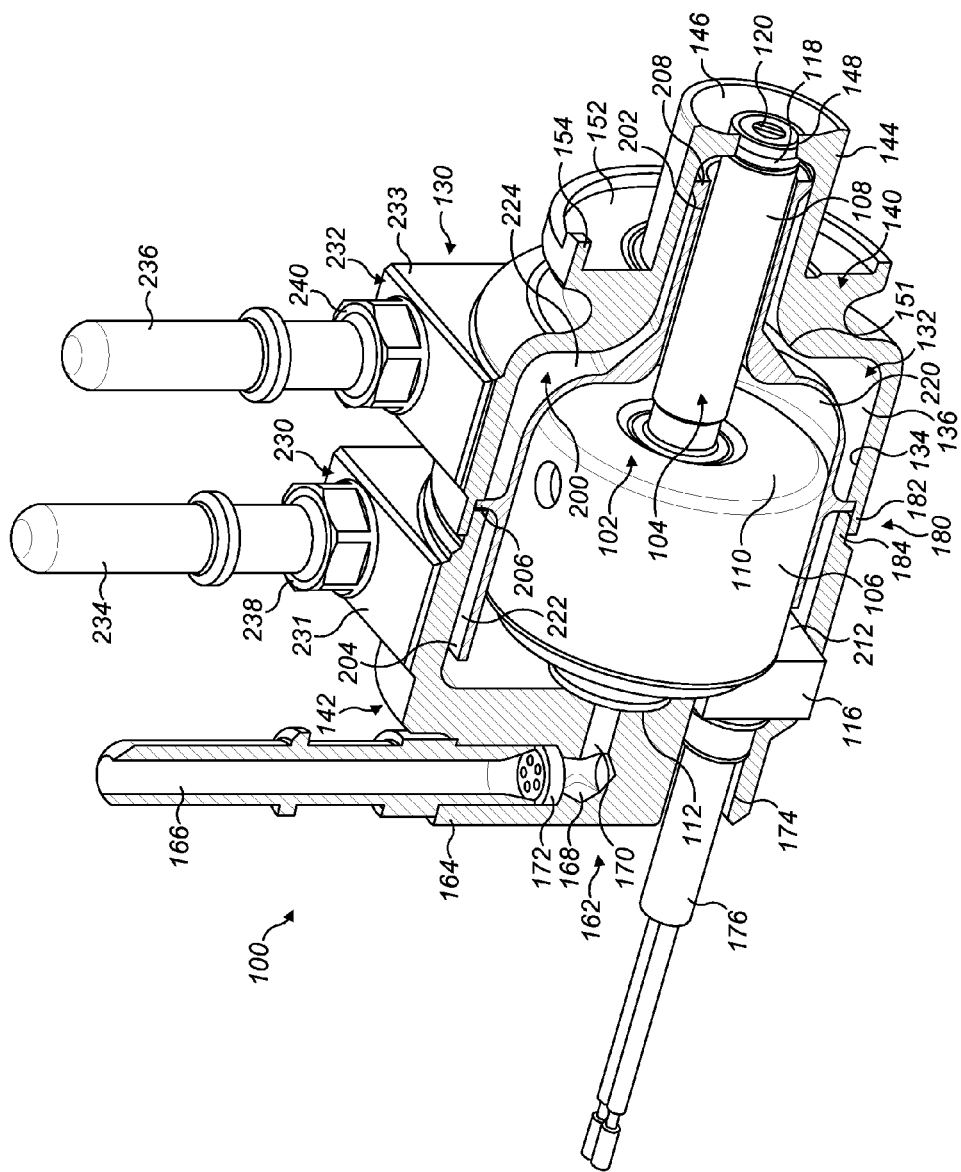
FIGS. 1-5 show a known reagent pump assembly compatible with embodiments of the present invention.

Like reference numerals are used below to denote like features. It is noted that the pump assembly is generally referenced as feature 100 in FIGS. 1 to 14 though it is appreciated that the arrangement of the pump assembly inlet and outlet ports and reagent port will vary to suit the various connector elements (300, 400, 500, 600, 700, 800) being described.

It is noted that "AdBlue" is a commercially available urea-based reagent that may be used as the reagent in the embodiments of the invention described below. The cooling fluid (or "coolant fluid") may be water.

A reagent pump assembly which is compatible with the above connector elements and arrangements in accordance with embodiments of the present invention is described below in relation to FIGS. 1 to 5.

Figure 2:
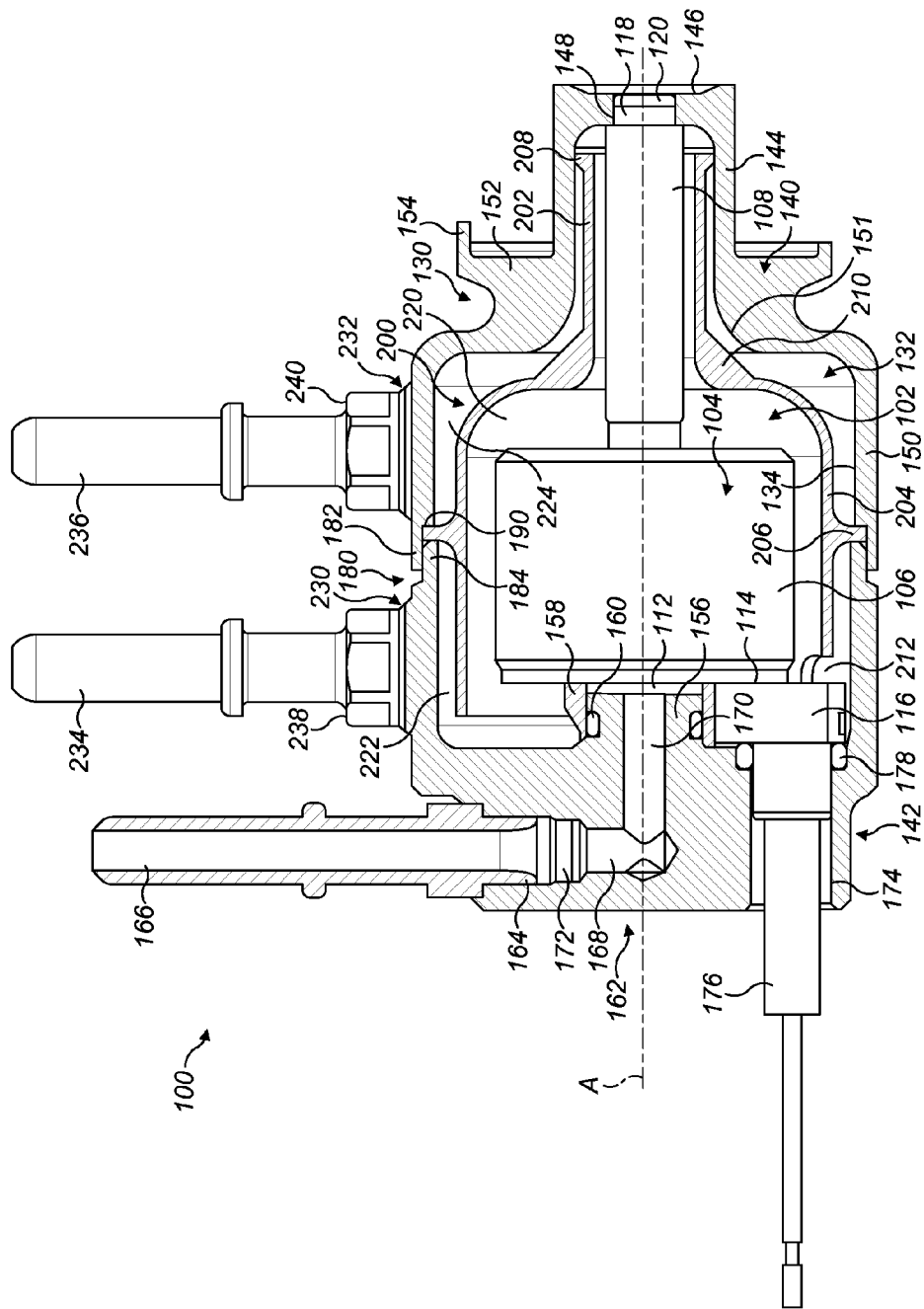

Referring first to FIGS. 1 and 2, the pump assembly 100 includes a reagent dosing unit with an integrated pump and nozzle arrangement, referred to hereafter as a reagent dosing pump 102. The pump 102 is a reagent dosing pump of any suitable type, for example as described in EP-A-1878920, to which reference can be made for further details of the pump 102.

The pump 102 comprises a pump housing 104 having a generally cylindrical pump body portion 106 that defines a pump axis (A in FIG. 2), and a generally cylindrical nozzle portion 108 that extends from a first face 110 of the body portion 106 along the pump axis A. The nozzle portion 108 has a relatively small diameter compared to the body portion 106.

The body portion 106 of the pump housing 104 houses a pumping mechanism (not shown), such as a solenoid-actuated pumping mechanism. In use, the pumping mechanism receives reagent through a reagent inlet 112 provided on a second face 114 of the body portion 106, opposite the first face 110. An electrical connection point 116 is also located on the second face 114 of the body portion 106 (not visible in FIG. 1), to provide an operating current to the solenoid actuator of the pumping mechanism. As is known from EP-A-1878920, the pumping mechanism includes a reciprocating pumping element, such as a plunger or piston, and is arranged to increase the pressure of a pre-defined quantity of reagent on each cycle of the pumping element.

The nozzle portion 108 of the pump housing 104 houses a delivery passage (not shown) that, in use, receives the pressurised reagent from the pumping mechanism, and conveys it to a reduced-diameter outlet end 118 of the nozzle portion 108. The outlet end 118 houses an atomising nozzle 120 that atomises the reagent as it exits the pump 102.

The pump assembly 100 also includes a jacket 130 having an internal cavity 132 in which the pump 102 is received. The cavity 132 is defined by an internal wall 134 of the jacket 130. In general terms, the shape of the cavity 132 is an enlarged version of the shape defined by the pump housing 104. In this way, the internal wall 134 of the cavity 132 is spaced from the pump housing 104 to define a volume 136 for cooling fluid therebetween.

The jacket 130 is a two-piece assembly, optionally made from cast stainless steel, comprising a first jacket part 140 that receives the nozzle portion 108 and a part of the body portion 106 of the pump housing 104, and a second jacket part 142 that receives a remaining part of the body portion 106.

The first jacket part 140 comprises a tubular portion 144 that extends along the pump axis A to receive part of the nozzle portion 108 of the pump housing 104. At one end, the tubular portion 144 is provided with an inwardly-directed flange 146 having a central aperture 148 that receives the reduced-diameter outlet end 118. The outlet end 118 is an interference fit in the aperture 148, and additionally may be laser welded or otherwise secured to the flange 146. The interface between the outlet end 118 and the flange 146 is fluid-tight, so as to seal the volume 136 for cooling fluid at the outlet end 118 of the pump 102.

The first jacket part 140 further comprises an enlarged-diameter portion 150 that extends along the axis A away from the outlet end 118 of the pump 102. The enlarged-diameter portion 150 receives a part of the body portion 106 of the pump housing 104, including the first face 110 of the body portion 106.

Adjacent to where the tubular portion 144 and the enlarged-diameter portion 150 of the first jacket part 140 meet, the jacket part 140 is provided with a mounting boss 152 in the form of an outwardly directed flange. In use, the mounting boss 152 is mounted to a port of an exhaust pipe or manifold (not shown), optionally with a sealing gasket, so that the atomising nozzle 120 is positioned in a suitable location for reagent to be dispensed into the exhaust gas stream. A locating tab 154 projects from the mounting boss 152 to engage with a corresponding locating recess (not shown) in the port, to ensure correct orientation of the pump assembly 100 with respect to the exhaust pipe, in use.

The second jacket part 142 is generally cup-shaped to enclose the end of the pump 102 opposite the outlet end 118. The second jacket part 142 therefore receives a part of the body portion 106 of the pump housing 104, including the second face 114 of the body portion 106.

A projection or land 156 extends axially from the internal wall 134 of the cavity 132 in the second jacket part 142 towards the outlet end 118 of the pump, to meet the inlet port 112 on the second face 114 of the housing pump body portion 106. A collar 158 (shown most clearly in FIG. 2) is provided on the second face 114 of the pump body portion 106 that receives the land 156. An O-ring 160 is provided to create a fluid-tight seal between the collar 158 and the land 156.

Figure 3:
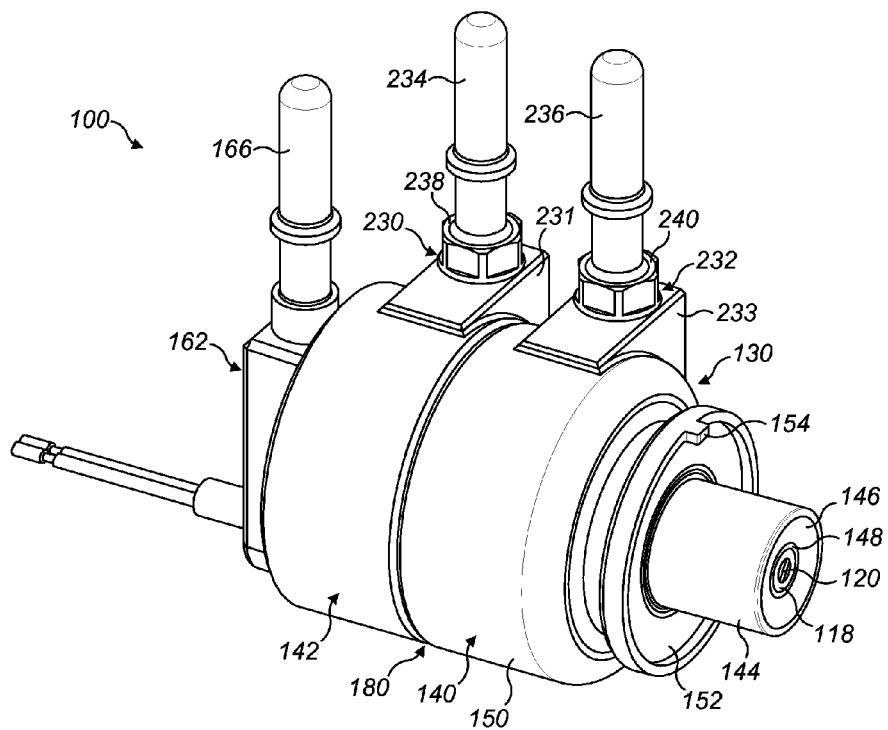

Referring additionally to FIG. 3, the end of the second jacket part 142 remote from the outlet end 118 comprises a connection block 162 of generally cuboidal shape. A top face of the connection block 162 is provided with a reagent inlet port 164 that receives a tubular reagent inlet connector 166. The inlet connector 166 extends radially with respect to the pump axis A and is connected to a reagent supply line (not shown) in use.

As shown in FIGS. 1 and 2, the inlet port 164 of the connection block 162 is in fluid communication with the reagent inlet 112 of the pump 102 by way of first and second passages 168, 170 in the second jacket part 142. The first passage 168 extends radially inwards from the inlet port 164 of the connection block 162 to intersect the pump axis A, and the second passage 170 extends along the pump axis A from the first passage 168, through the connection block 162 and the land 156, to connect with the reagent inlet 112 of the pump 102. The seal provided by the O-ring 160 prevents leakage of reagent into the cooling fluid volume 136 between the land 156 of the second jacket part 142 and the collar 158 of the pump housing 104.

A filter 172 is located in the flow path between the inlet connector 166 and the reagent inlet 112 of the pump 102. In this example, the filter 172 is received in the inlet port 164. The filter 172 is conveniently a disc filter, arranged to prevent particulate contaminants in the reagent, such as urea crystals, from entering the pump 102.

The connection block 162 is also provided with a drilling 174 to admit an electrical connector 176. The electrical connector 176 connects with the electrical connection point 116 of the pump 102. A further O-ring 178 is provided to seal the electrical connector 176 in the drilling 174.

The first and second jacket parts 140, 142 meet at an annular overlapping joint 180. At the joint 180, a lip 182 of the first jacket part 140 is fitted over a corresponding lip 184 of the second jacket part 142. The joint 180 may be secured and sealed by suitable means, such as by laser welding or by providing an adhesive layer between the lips 182, 184.

As will now be described, the pump assembly 100 is arranged so that, in use, cooling fluid is caused to flow through the volume 136 defined between the internal wall 134 of the jacket 130 and the pump housing 104 in such a way that cooling of the pump 102 is optimised.

Figure 4:
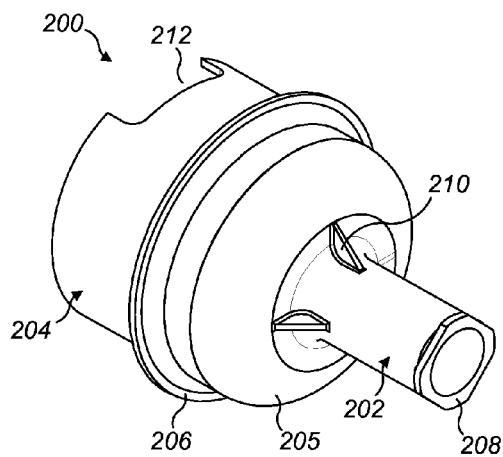
Figure 5:
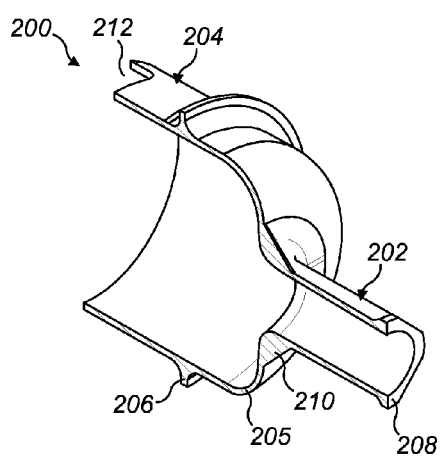

The pump assembly 100 includes a generally bell-shaped flow guide 200 mounted between the pump housing 104 and the jacket 130. The flow guide 200, which is shown in isolation in FIGS. 4 and 5, is open at both ends and comprises a tubular portion 202 that receives part of the nozzle portion 108 of the pump housing 104, and an enlarged-diameter portion 204 that receives the body portion 106 of the pump housing 104.

The enlarged-diameter portion 204 carries an outwardly-directed annular support or mounting flange 206 that is retained between the first and second jacket parts 140, 142 at the overlapping joint 180 to secure the flow guide 200 in position within the jacket cavity 132. As shown most clearly in FIG. 2, the mounting flange 206 is engaged between the end of the second jacket part 142 closest to the outlet end 118 of the pump 102, and an internal shoulder 190 of the first housing part 140 defined where the lip 182 meets the remainder of the first housing part 140.

The tubular portion 202 of the flow guide 200 ends short of the outlet end 118 of the housing nozzle portion 108. As shown in FIGS. 4 and 5, four outwardly-extending support tabs 208 are provided around the periphery of the end of the tubular portion 202. When assembled, as shown in FIGS. 1 and 2, the support tabs 208 press against the cavity wall 134, to provide additional support for the flow guide 200 within the jacket cavity 132.

The flow guide 200 is conveniently made from an injection-moulded plastics material. To increase the rigidity of the flow guide 200, support ribs 210 are provided that extend from the tubular portion 202 to the enlarged-diameter portion 204 of the flow guide. A cut-out 212 is provided in the enlarged-diameter portion 204 to accommodate the electrical connection point 116 of the pump 102.

The dimensions of the flow guide 200 are such that there are clearances between the flow guide 200 and the pump housing 104 and between the flow guide 200 and the cavity wall 134, except for where the mounting flange 206 and the support tabs 208 engage with the jacket 130.

The mounting flange 206 is a close fit between the jacket parts 140, 142, so that fluid flow between the mounting flange 206 and the jacket 130 is prevented or at least substantially restricted. In contrast, relatively unrestricted fluid flow is possible around the end of the flow guide 200 where the support tabs 208 are provided, since fluid can flow through the gaps between the tabs 208.

The flow guide 200 divides the cooling fluid volume 136 into three compartments. A first or inner compartment 220 is defined in part by the pump housing 104 and in part by the innermost surface of the flow guide 200. The inner compartment 220 is therefore arranged concentrically around the pump housing 104.

The remainder of the cooling fluid volume 136 outside the inner compartment 220, between the flow guide 200 and the wall 134 of the cavity 132, is divided by the mounting flange 206 into an inlet compartment 222 and an outlet compartment 224, the inlet compartment 222 being farthest from the outlet end 118 of the pump 102, and the outlet compartment 224 being closest to the outlet end 118. The inlet and outlet compartments 222, 224 are each arranged concentrically around the inner compartment 220.

The inlet compartment 222 is defined in part by the outermost surface of the enlarged-diameter portion 204 of the flow guide 200 and in part by the cavity wall 134 in the second jacket part 142. The outlet compartment 224 is defined in part by the outermost surface of the enlarged-diameter portion 204 of the flow guide 200, in part by the outermost surface of the tubular portion 202 of the flow guide 200, and in part by the cavity wall 134 in the first jacket part 140.

The inlet compartment 222 is in fluid communication with the inner compartment 220 by way of the open end of the enlarged-diameter portion 204 of the flow guide 200, and the inner compartment 220 is in fluid communication with the outlet compartment 224 by way of the open end of the tubular portion 202 of the flow guide 200. Fluid flow between the inlet compartment 222 and the outlet compartment 224 is prevented or substantially restricted by the engagement of the mounting flange 206 with the jacket 130 at the overlapping joint 180.

An inlet port 230 and an outlet port 232 for cooling fluid are provided on the first and second jacket parts 140, 142 respectively. Each port 230, 232 comprises a passage or drilling (not shown) accommodated in a respective block 231, 233 provided on the circumference of each jacket part 140, 142. A tubular inlet connector 234 is received in the inlet port 230, and a tubular outlet connector 236 is received in the outlet port 232. The connectors 234, 236 are secured to the jacket 130 by retaining nuts 238, 240. In use, the inlet connector 234 is connected to a source of cooling fluid, such as the cooling water system of the engine, by way of a cooling fluid supply line, and the outlet connector 236 is connected to a return line for cooling fluid. Advantageously, the connectors 234, 236 are connected to the fluid lines by means of a press-fit or by suitable fittings provided at the ends of the fluid lines to mate with the connectors 234.

Each port 230, 232 communicates with the cooling fluid volume 136 within the jacket 130 by way of a respective passage (not shown) in the jacket 130. The passage from the inlet port 230 opens into the inlet compartment 222, and the passage from the outlet port 232 opens into the outlet compartment 224.

As shown most clearly in FIG. 3, the inlet and outlet ports 230, 232 are arranged so that the cooling fluid flows into or out of the volume 136 in a direction substantially perpendicular to, and offset from, the pump axis A.

In other words, the inlet port 230 and its respective passage (not shown) are arranged so that fluid flows from the inlet connector 234 into the inlet compartment 222 along a flow axis that is perpendicular to, but does not intersect, the pump axis A. Instead, the flow axis is offset from the pump axis A and is generally tangential to the inlet compartment 222, so that fluid can flow relatively freely into the inlet compartment 222 and around the inlet compartment 222 in an annular manner without encountering obstacles in its flow path that would hinder the flow of fluid.

Likewise, the outlet port 232 and its respective passage (not shown) are arranged so that fluid flows from the outlet compartment 224 into the outlet connector 236 along a flow axis that is perpendicular to, but offset from, the pump axis A, and that is generally tangential to the outlet compartment 224. In this way, fluid can flow relatively freely around the outlet compartment 224 in an annular manner and out of the outlet compartment 224 without encountering flow-hindering obstacles.

To improve further the fluid flow through the cooling fluid volume 136 in use, both the wall 134 of the jacket cavity 132 and the surfaces of the flow guide 200 have smoothed or radiused corners and edges, in preference to sharp corners. For example, where the enlarged-diameter portion 150 meets the tubular portion 144 of the first jacket part 140, a radiused transition region 151 is provided to minimise the resistance to fluid flow in the outlet compartment 224. Similarly, where the enlarged-diameter portion 204 meets the tubular portion 202 of the flow guide 200, a radiused transition region 205 (see FIGS. 4 and 5) is provided.

In use, cooling fluid enters the pump assembly 100 through the inlet port 230, and flows first into the inlet compartment 222. The cooling fluid then flows into the inner compartment 220, where it passes between the flow guide 200 and the pump housing 104, where heat is transferred from the pump 102 to the cooling fluid. Once the fluid reaches the end of the tubular portion 202 of the flow guide 200, it passes out of the inner compartment 220 into the outlet compartment 224, passing first between the tubular portions 202, 144 of the flow guide 200 and the first jacket part 140 respectively, and then between the enlarged-diameter portions 204, 150 of the flow guide 200 and the first jacket part 140 respectively. The cooling fluid then passes out of the pump assembly 100 through the outlet port 232.

Because the inlet and outlet ports 230, 232 are arranged generally tangentially with respect to the inlet and outlet compartments 222, 224, the cooling fluid tends to flow in a helical flow path through the cooling fluid volume 136. Advantageously, this increases the time taken for fluid to pass through the pump assembly 100, therefore increasing the time available for heat transfer from the pump 102 to the fluid, in comparison to if the cooling fluid were to flow in a direction substantially parallel to the pump axis A.

By virtue of the flow guide 200, the cooling fluid is guided across substantially the whole of the surface of the pump housing 104 as it flows through the inner compartment 220. Advantageously, therefore, the flow guide 200 ensures efficient transfer of heat from the pump 102 to the cooling fluid. Because the flow guide 200 extends towards the outlet end 118 of the pump 102, the flow guide 200 helps to ensure that the cooling fluid flows along the length of the nozzle portion 108 of the pump housing 104, thereby guarding against overheating of the reagent close to the atomising nozzle 120.

Furthermore, the pump body portion 106, which houses the heat-generating solenoid actuator, may require more cooling than the nozzle portion 108 of the pump housing 104. In this example, therefore, the arrangement of the flow guide 200 causes the cooling fluid to flow first past the pump body portion 106, and then past the nozzle portion 108 of the pump housing 104 before exiting through the outlet port 232. In this way, the cooling capacity of the cooling fluid flow is optimised.

As will be appreciated from FIG. 3, the inlet port 230 and the outlet port 232 for cooling fluid are conveniently provided on the same side of the pump assembly 100, so that the inlet connector 234 and the outlet connector 236 extend parallel to one another. In addition, the flow guide 200 causes the cooling fluid to travel in a first direction parallel to the axis A towards the outlet end 118 of the pump 102 in the inner compartment 220, and then along a second direction that is antiparallel or opposite to the first direction. The cooling fluid is therefore returned towards the inlet port 230. Accordingly, the inlet port 230 and the outlet port 232, and their respective connectors 234, 236 can be positioned adjacent to one another.

In this way, the fluid supply and return lines (not shown) can be connected to the pump assembly 100 in a space-efficient manner, since they need only attach to one side of the pump assembly 100.

Similarly, the inlet connector 166 for reagent extends from the pump assembly 100 in the same direction as the inlet and outlet connectors 234, 236, so that the reagent supply line (not shown) can also be connected to the pump assembly 100 in a space-efficient manner.

Referring back to FIG. 2, it will be appreciated that jacket 130 serves to clamp the pump housing 104 at each end. The outlet end 118 of the nozzle portion 108 of the housing 104 is retained in the aperture 148 in the flange 146 of the first jacket part 140, whilst the second face 114 of the body portion 106 of the housing 104 abuts the land 156 of the second jacket part 142. In this way, the jacket 130 serves to brace the pump housing 104 against any expansion or deformation along the pump axis A that could otherwise occur if reagent were to freeze inside the pump 102. The risk of mechanical failure of the pump housing 104 in such circumstances is therefore reduced, and in particular, the risk of the nozzle portion 108 being forced away from the body portion 106 is mitigated. The flange 146 may have a concave shape, as shown most clearly in FIG. 1, to provide a high degree of resistance to movement of the nozzle portion 108 of the housing 104 away from the body portion 106.

It will be appreciated that many variations and modifications of the above described reagent pump assembly could be contemplated.

For example, the inlet compartment of the cooling fluid volume could be omitted, for instance by providing a flow guide that is truncated at the position of the mounting flange. In such a case, fluid could flow from the inlet port directly into the inner chamber, but the flow guide would still serve to ensure that the cooling fluid came into contact with substantially the whole surface of the pump housing.

By reversing the position of the inlet and outlet ports of the illustrated example above, the cooling fluid would flow past the nozzle portion of the pump housing before the pump body portion. This could be desirable in some applications, for example where the nozzle portion is exposed to particularly high temperatures in use compared to the pump body portion, or where some heat can be dissipated from the pump assembly by air cooling or other means so that water cooling of only the nozzle portion is required.

The flow guide is conveniently provided as a separate component. However, in some examples, the flow guide form part of or is integral with the jacket, or forms part of or is integral with the pump housing. The flow guide may be formed as a single piece, as in the illustrated example, or may be formed from two or more parts that engage with one another or otherwise cooperate.

In the above-described example, the jacket is in two parts, which is convenient for manufacturing reasons. It will be appreciated, however, that the jacket could have any suitable alternative form. For example, a jacket formed from three or more pieces could be provided.

The arrangement of the inlet and outlet ports, the reagent inlet port, and the electrical connection to the pump actuator may be chosen to suit any particular application. For example, it would be possible to arrange the inlet and outlet ports at the same axial distance along the pump assembly, in which case the flow guide could include axially-extending ribs or baffles to divide the cooling fluid volume into suitable inlet and outlet compartments.

In the illustrated examples described above, the mounting flange of the flow guide separates the inlet and outlet compartments, and the body of the flow guide separates the inner compartment from both the inlet and outlet compartments. However, alternative ways of separating the compartments can be contemplated. For example, the inlet and outlet compartments could be separated by an inwardly-directed flange or ridge provided on the jacket, or by a separate separating member such as an O-ring received on the flow guide.

Figure 6:
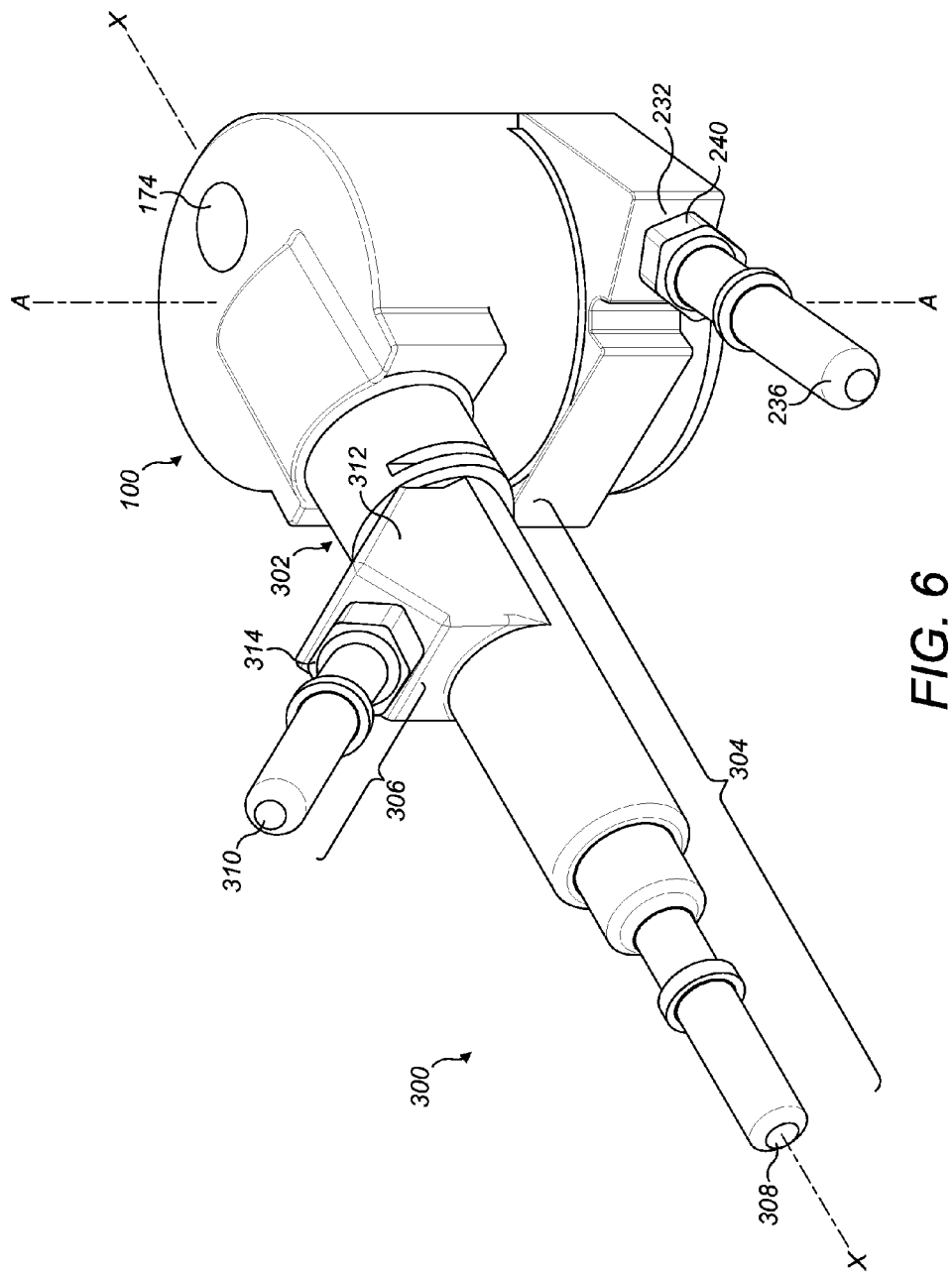
FIG. 6 shows a perspective view of a connector element in accordance with a first embodiment of the present invention.

FIG. 6 shows a connector element 300 in accordance with a first embodiment of the present invention. The connector element 300 in FIG. 6 is engaged with a pump assembly 100. It is noted that the particular arrangement of the connector element 300 shown in FIG. 6 has resulted in a slightly different arrangement of coolant inlet and outlet ports and reagent inlet port compared to the pump assembly of FIGS. 1-5.

The pump assembly 100 of FIG. 6 comprises a coolant outlet port 232 and a combined reagent inlet and coolant inlet port 302. A tubular coolant outlet connector 236 is received on the outlet port 232 and is secured to the pump assembly by retaining nut 240. The pump assembly 100 shown in FIG. 6 further comprises a drilling 174 to admit an electrical connector 176 (not shown in FIG. 6).

The pump assembly defines a pump axis A and the connector element 300 defines a main connector axis X.

The connector element 300 comprises a first generally tubular portion 304 which is disposed along the connector axis X and a second generally tubular portion 306 which is disposed at an angle to the first portion 304 (and so at an angle to the connector axis X). The second tubular portion defines an axis Y.

One end of the first portion 304 is connected into the combined port 302. A second end of the first portion comprises a reagent inlet port 308.

The second portion 306 of the connector element defines at one end a coolant inlet port 310 for receiving cooling fluid for supply to the pump assembly 100.

The second tubular portion 306 is accommodated in a block 312 provided part way along the length of the first tubular portion 304 and is secured in place by means of a retaining nut 314.

Figure 7:
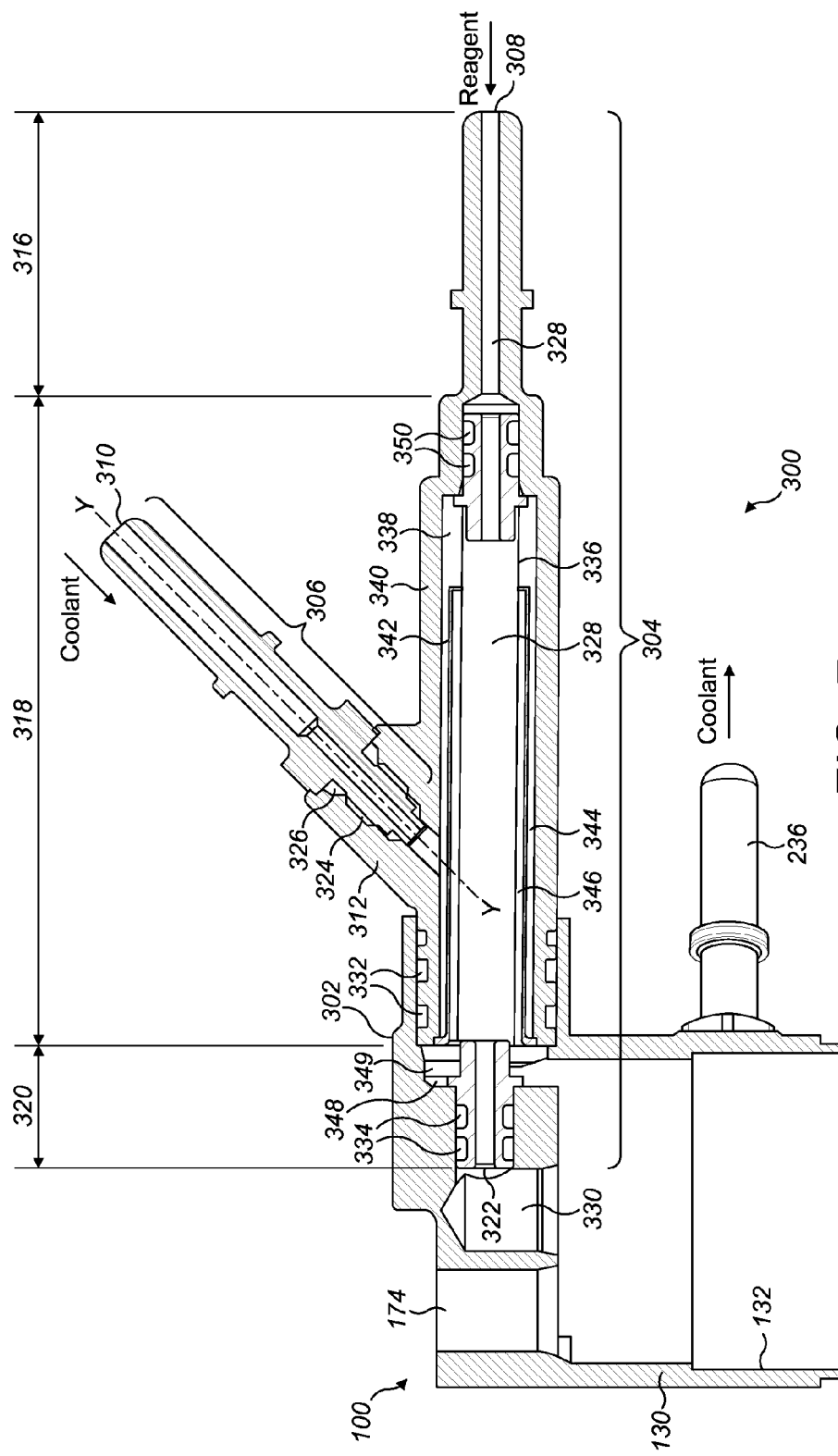
FIG. 7 shows a cross section of the connector element of FIG. 6.

FIG. 7 is a side view cross section of the connector element 300 of FIG. 6. It can now be seen that the pump assembly 100 comprises a jacket 130 which defines a cavity 132 in which a pump 102 (not shown in FIG. 7) is received. The first tubular portion 304 of the connector element 300 can be seen to comprise three general sections: a nozzle end 316 which includes the reagent inlet port 308, a central section 318 which is connected to the second tubular portion 306 and an outlet end 320 which comprises a reagent outlet port 322 that is in fluid communication with the pump assembly 100.

The second tubular portion 306 of the connector element 300 is received within a port 324 in the block 312. O rings 326 are provided to create a fluid tight seal between the second tubular portion 306 and the first tubular portion 304/block 312.

The first tubular portion 304 comprises a reagent passage 328 that forms a flow path for reagent into the pump assembly. The reagent passage is located axially and extends from the reagent inlet port 308, along the axis X to the reagent outlet port 322 that is in fluid communication with a reagent inlet region 330 of the pump assembly 100. O rings 332 and 334 are provided to create a fluid tight seal between the outlet end 320 of the connector element 300 and the jacket 130 of the pump assembly 100.

The central section 318 of the first portion 304 of the connector element 300 has a larger cross section than the nozzle 316 and outlet 320 ends. The reagent passage 328 is defined by a generally cylindrical reagent wall component 336 that extends about the axis X through the central portion 318. An annular volume 338 is defined between the reagent wall 336 and the outer wall 340 of the central section (the outer wall effectively forming a jacket around the reagent passage and reagent wall 336).

A generally annular sleeve 342 (also referred to as flow guide 342) is located within the annular volume 338 such that the annular volume 338 is divided into first 344 and second 346 compartments. The first compartment 344 is defined in part by the outer wall 340 of the central section 318 and in part by the annular sleeve 342. The second compartment 346 is defined in part by the annular sleeve 342 and in part by the reagent wall 336. The first 344 and second 346 compartments are in fluid communication at one end of the central section 318 (the end closest to the inlet/nozzle 316 end of the connector element 300). The annular sleeve 342 therefore defines a flow guide within the annular volume 338.

The first compartment 344 is additionally in fluid communication with the coolant inlet port 310 and the second compartment 346 is additionally in fluid communication with a coolant inlet passage 348 within the pump assembly 100 via connector coolant outlet port 349. The coolant inlet passage 348 may be in communication with a flow guide arrangement 200 such as that described in relation to FIGS. 1-5.

O rings 350 create a fluid tight seal between the annular volume 338 and the inlet end 316 of the connector element 300.

In use cooling fluid enters the connector element 300 via the coolant inlet port 310 on the second portion 306 of the connector element 300. Fluid flows through the second tubular portion 306 into the first compartment 344 where it passes between the flow guide 342 and the wall 340 of the central portion 318. Fluid then flows through the first compartment 344 in the general direction of the inlet end 316 of the first portion 304 of the connector 300. Fluid then flows into the second compartment 346 (via drillings or other passages in guide 342—not shown) where it moves in the general direction of the outlet end 320 of the first portion 304 of the connector 300 and exits the connector element 300 through the connector coolant outlet port 349. During this process heat is transferred from the reagent within the reagent passage 328 into the coolant fluid. In this manner the reagent fluid can be cooled before it enters the pump assembly 100. In the event that the reagent has vaporised due to heat in the engine system before it reaches the connector element 300, the heat exchange arrangement provided by the coolant inlet 310, coolant outlet 349, first 344 and second 346 compartments and flow guide 342 serve to condense the reagent back into liquid form and subsequently to cool it before it enters the pump assembly 100.

It is noted that, although the arrangement of FIGS. 6 and 7 shows the coolant inlet port 310 located on the connector element and the coolant outlet port 236 located on the pump assembly, the arrangement may be reversed such that coolant fluid is provided directly to the pump assembly and coolant fluid received from the pump assembly is passed through the second compartment 346 to the first compartment 344 and then out through the second tubular portion 306. In this reversed arrangement the port 310 would now be an outlet port and port 236 would be an inlet port.

Figure 8:
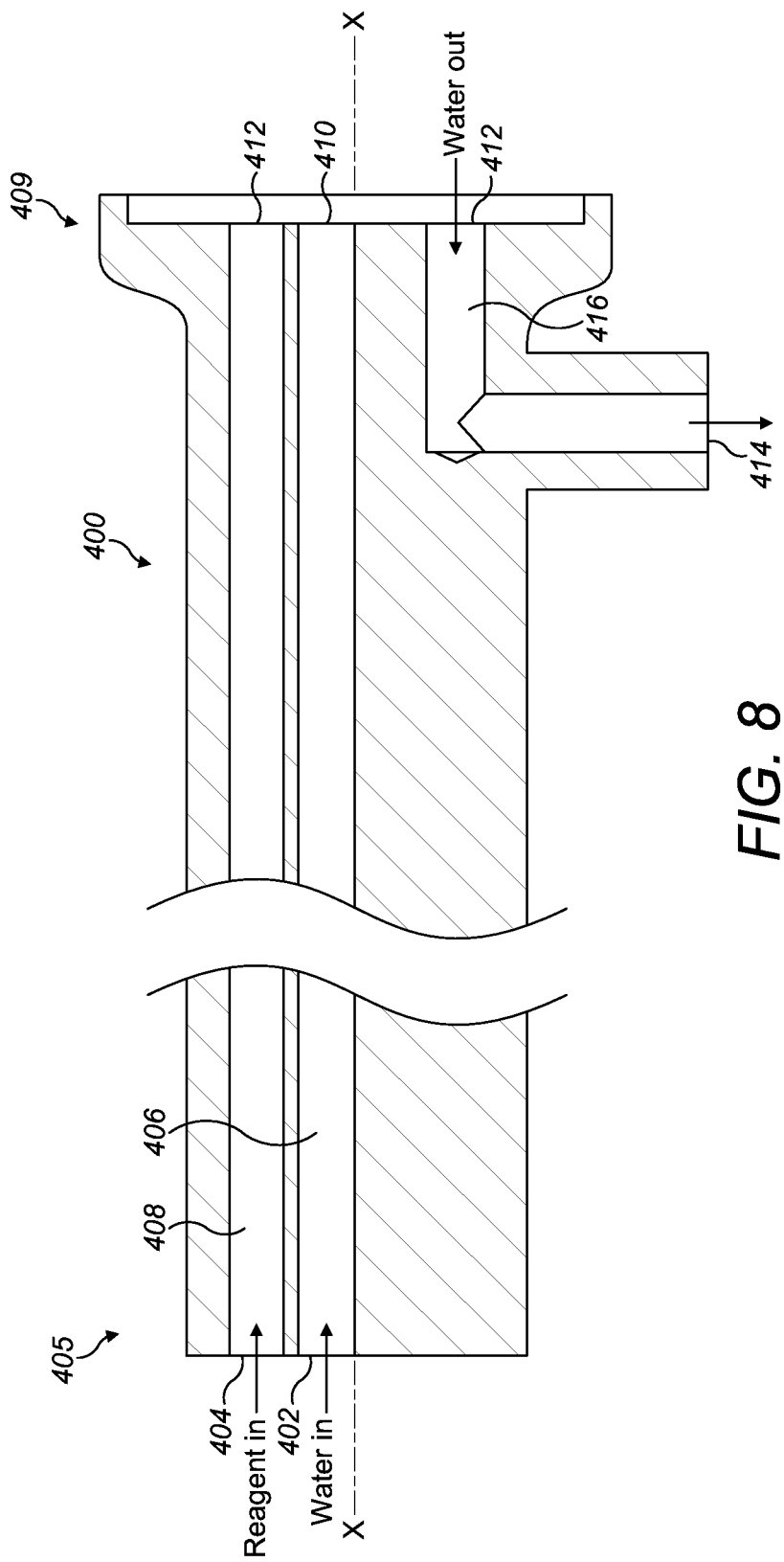
FIG. 8 shows a connector element in accordance with a second embodiment of the present invention.

FIG. 8 shows a second embodiment of a connector element 400 in accordance with the present invention. The connector element 400 of FIG. 8 is generally tubular and defines an axis X. A coolant inlet port 402 and reagent inlet port 404 are defined at one end 405 of the connector element 400 and are in fluid communication with a coolant passage 406 and a reagent passage 408 respectively. The coolant passage 406 and reagent passage 408 run in parallel to each other and the axis X of the connector element 400 to a second end 409 of the connector element where they are in fluid communication with a coolant outlet port 410 and a reagent outlet port 412 respectively. The coolant outlet port 410 and reagent outlet port 412 are aligned with complementary openings (not shown in FIG. 8) in the jacket 130 of a pump assembly 100 (not shown in FIG. 8). The jacket 130 of the pump assembly 100 further comprises a coolant outlet opening for coolant fluid that exits the pump assembly 100. The connector element 400 comprises a coolant return inlet port 412 and a coolant return outlet port 414 which are connected by an "L" shaped passage 416. It can therefore be seen that the coolant fluid that returns from the pump assembly via the coolant return inlet port 412 does not travel down the entire length of the connector element 400 but instead exits the element 400 in a direction that is substantially perpendicular to the axis X close to the second end 409 of the connector element 400.

This connector element 400 has the advantage that it provides a single connection area into and out of the pump assembly 100 where coolant fluid and reagent can be supplied into the pump assembly and "used" coolant fluid (i.e. coolant fluid that has passed through the pump assembly and has absorbed heat energy from the pump) can be removed from the pump assembly. Furthermore, since the coolant return (412, 414, 416) is routed away from the axis of the connector element 400 in the region of the second end 409 the heating effect of the returning (i.e. used) coolant fluid on the reagent fluid can be minimised. The reagent fluid therefore benefits from the cooling effect of the coolant supply passage 406 which is in close proximity to the reagent passage 408. The connector element 400 of FIG. 8 may therefore be used where the temperature of the incoming reagent fluid is of high importance.

Figure 11:
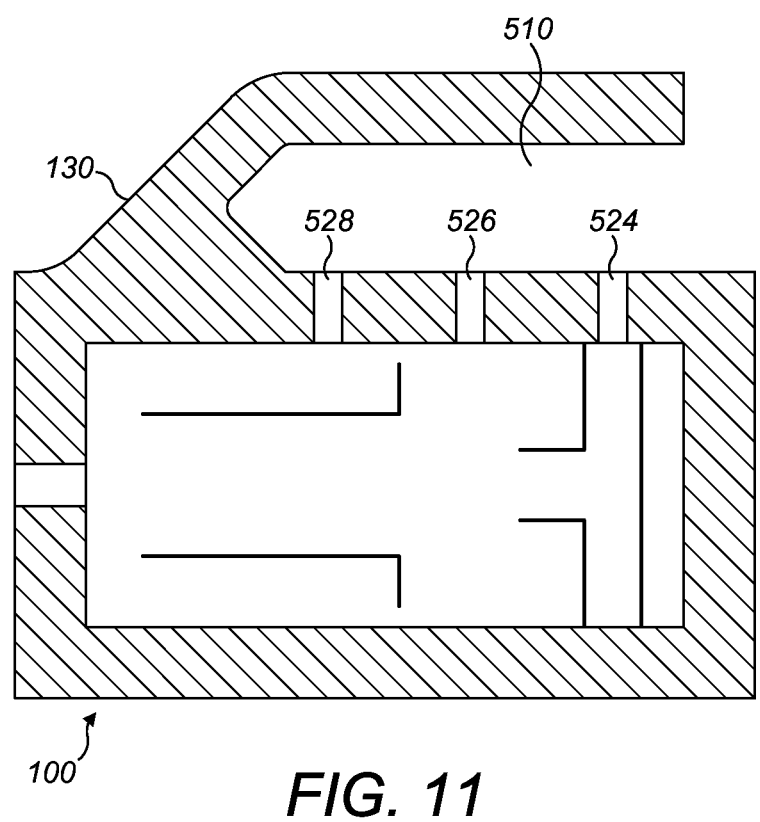
FIG. 11 shows a pump assembly for use with the connector element in accordance with the third embodiment of the present invention.

FIGS. 9 and 10 show a third embodiment of a connector element 500 in accordance with the present invention. FIG. 11 illustrates a pump assembly arrangement 100 for use with the embodiment of FIGS. 9 and 10.

FIGS. 9 and 10 show a connector element 500 in which three microbores 502, 504, 506 within the body of the connector element 500 are used to convey coolant fluid to and from the pump assembly 100 and to supply reagent fluid to the assembly 100. As shown in FIG. 9 each microbore 502, 504, 506 extends axially through the connector 500 (parallel to connector element axis X) and in parallel to one another.

The connector element 500 is formed into a male type connector at one end 508 for engagement with a complementarily shaped socket 510 on the pump assembly 100 (shown in FIG. 11). At the connection end 508 of the connector element 500 the flow paths defined by the microbores 502, 504, 506 change direction by 90 degrees and coolant fluid outlet 512 and inlet 514 holes and a reagent outlet hole 516 are defined in the surface of the connector element 500.

O rings 518, 520 and 522 create a fluid tight seal between the inlet/outlet holes and the socket on the pump assembly.

FIG. 11 shows a pump assembly 100 that has been adapted to receive the connector element 500 of FIGS. 9 and 10. In contrast to the pump assembly of FIGS. 1 to 3 it can be seen that the jacket 130 has been adapted to comprise a socket 510 for receiving the connector element 500. Drillings 524, 526, 528 in the jacket are arranged to put the inlet and outlet holes (512, 514, 516) of the connector element in fluid communication with the inside of the pump assembly. (Reagent hole 516 is arranged to align with drilling 524, coolant hole 512 is arranged to align with drilling 526 for the supply of coolant to the pump assembly and coolant hole 514 is arranged to align with drilling 528 for the return of coolant from the pump assembly.)

Figure 12:
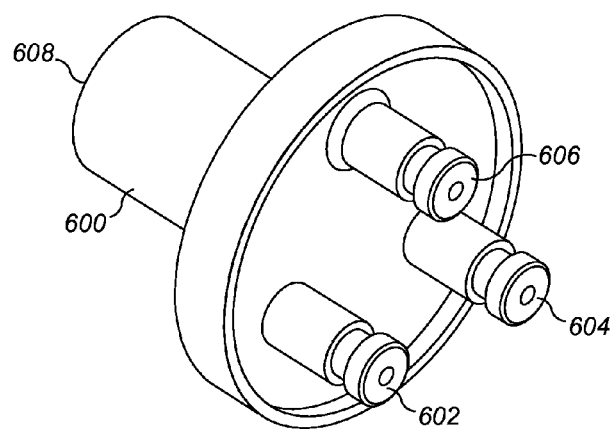
FIG. 12 shows a connector element in accordance with a fourth embodiment of the present invention.

FIG. 12 shows a fourth embodiment of a connector element 600 in accordance with the present invention. In FIG. 12 a connector element 600 is provided which comprises three nozzle members 602, 604, 606 for supply of cooling fluid and reagent to a pump assembly and for the removal of cooling fluid from the pump assembly. The three nozzle members 602, 604, 606 are arranged to engage with complementarily arranged sockets (not shown) on a pump assembly. The connector element 600 itself comprises a socket 608 for receiving a reagent and cooling fluid pipe/hose. Internal passages within the connector element are configured to put the relevant nozzle member in fluid communication with the appropriate passage within the pipe (e.g. a passage within the pipe that supplies reagent fluid is in communication with the reagent nozzle etc.).

Figure 13:
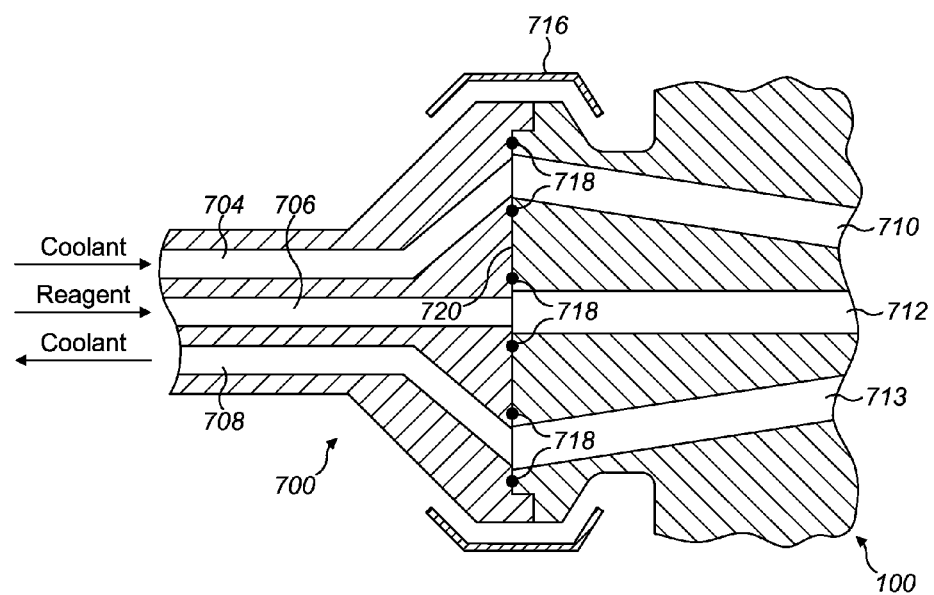
FIG. 13 shows a connector element in accordance with a fifth embodiment of the present invention.

FIG. 13 shows a fifth embodiment of a connector element 700 in accordance with the present invention. The embodiment of FIG. 13 is similar to that of FIG. 12. However, instead of comprising a series of nozzle members that engage with complementary sockets on the pump assembly, the connector element 700 comprises a face seal arrangement 720 in which the internal drillings 704, 706, 708 that convey fluid to and from the pump assembly 100 are placed into direct contact with complementary drillings 710, 712, 714 within the pump assembly. A dairy/pipe clamp arrangement 716 is used to secure the connector to the pump assembly and a number of O rings 718 create fluid seals between the pump assembly and the connector element. In the arrangement of FIG. 13 the reagent is supplied axially (706) and is flanked by the coolant supply 704 and coolant return 708 passages.

Figure 14:
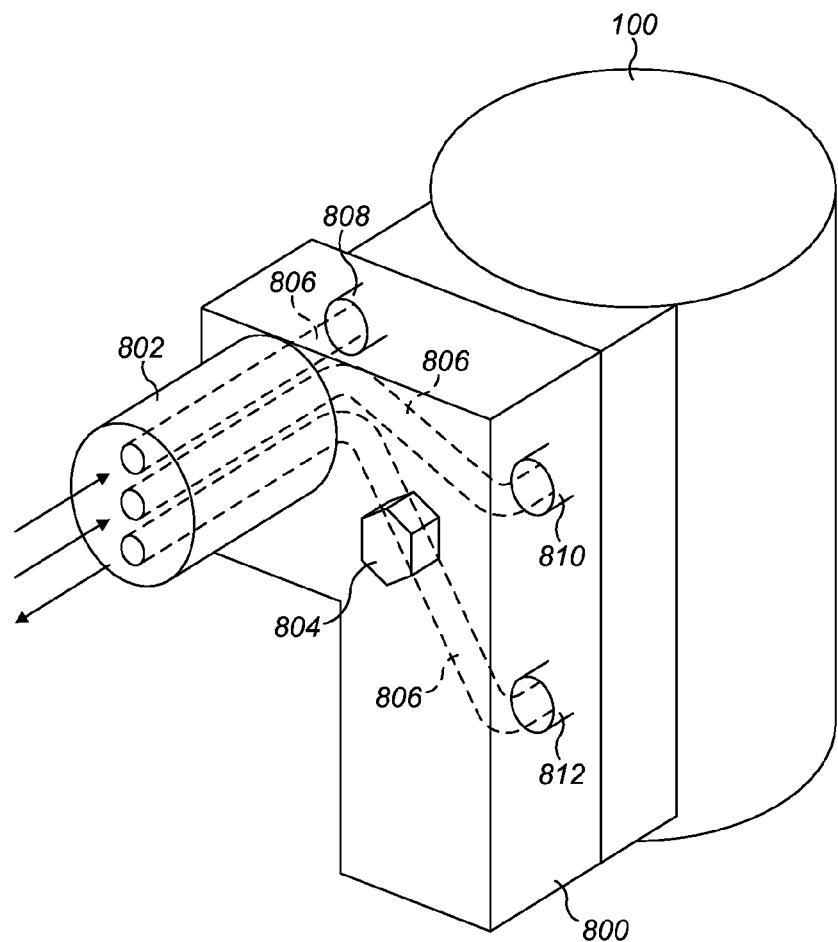
FIG. 14 shows a connector element in accordance with a sixth embodiment of the present invention.

FIG. 14 shows a sixth embodiment of a connector element 800 in accordance with the present invention. FIG. 14 also shows a pump assembly 100 and a fluid supply/return pipe 802. The connector element 800 of FIG. 14 comprises a block which is secured by one or more securing bolts 804 to the pump assembly 100. The connector block 800 comprises a number of angled and drilled holes 806. On the pump assembly facing part of the connector block the holes are arranged to match up with complementary holes within the pump assembly (see interface drillings 808, 810, 812). The opposite face of the connector block is interfaced with the fluid supply/return pipe 802.

The block 800 may be constructed of steel or plastic. The block 800 may be bolted to the pump assembly 100, such that both may be removed for servicing or inspection. The angled internal drilling arrangement is such that a coolant line is routed so that it enters/leaves the block directly adjacent to the reagent inlet. The other coolant line may be a straight line drilling which passes through the block. Sealing with the pump assembly may be by O-ring, or by face seal. The connector block may for example be of 1 cm depth.

Further variations and modifications not explicitly described above may also be contemplated without departing from the scope of the invention as defined in the appended claims.

The invention claimed is:

1. A selective catalytic reduction system of a vehicle comprising:
   a pump assembly comprising:
      a reagent inlet port which introduces reagent fluid into the pump assembly;
      a nozzle which provides an exit from the pump assembly for reagent to be discharged from the pump assembly such that the pump assembly pumps reagent fluid from the reagent inlet port to the nozzle; and
      a coolant port which introduces cooling fluid into the pump assembly or which discharges cooling fluid from the pump assembly such that the cooling fluid provides cooling to the pump assembly; and
   a connector element which mates with the pump assembly, the connector element defining a parting line with the pump assembly about which the connector element and the pump assembly are separable from each other, the connector element comprising:
      a reagent flow passage which receives reagent fluid at a first end from a reagent supply and supplies reagent fluid via a second end to the reagent inlet port on the pump assembly; and
      a coolant passage which communicates cooling fluid through the connector element, the coolant passage being in communication with the coolant port on the pump assembly.

2. A selective catalytic reduction system as claimed in claim 1, wherein the coolant passage is disposed around the reagent flow passage.

3. A selective catalytic reduction system as claimed in claim 1, wherein the coolant passage is disposed in a helical arrangement around the reagent flow passage.

4. A selective catalytic reduction system as claimed in claim 1, wherein the coolant passage is defined, in part, by a jacket which encloses at least a part of the length of the reagent flow passage.

5. A selective catalytic reduction system as claimed in claim 4, further comprising a flow guide disposed between the jacket and the reagent flow passage.

6. A selective catalytic reduction system as claimed in claim 5, wherein the coolant passage comprises
   a first compartment for cooling fluid defined in part by the flow guide and in part by the jacket, the first compartment being in fluid communication with a first port; and
   a second compartment for cooling fluid defined in part by the flow guide and in part by the reagent flow passage, the second compartment being in fluid communication with a second port;
   wherein the second compartment is in fluid communication with the first port by way of the first compartment.

7. A selective catalytic reduction system as claimed in claim 6, wherein the connector element defines a connector axis (X) and the connector element is arranged such that, in use, cooling fluid flows through the first compartment in a first direction parallel to the connector axis (X), and through the second compartment in a second direction opposite to the first direction.

8. A selective catalytic reduction system as claimed in claim 6, wherein the first port is an inlet port for cooling fluid into the connector element and the second port is an outlet port for supply of the cooling fluid into a coolant passage within the pump assembly.

9. A selective catalytic reduction system as claimed in claim 6, wherein the first port is an outlet port for cooling fluid from the connector element and the second port is an inlet port for cooling fluid from within the pump assembly to the connector element.

10. A selective catalytic reduction system as claimed in claim 1, wherein the coolant port on the pump assembly is a coolant inlet port for receiving cooling fluid and the coolant passage is in communication with the coolant inlet port.

11. A selective catalytic reduction system as claimed in claim 1, wherein the coolant port on the pump assembly is a coolant outlet port and the coolant passage is in communication with the coolant outlet port.

12. A selective catalytic reduction system as claimed in claim 1, wherein the coolant passage comprises a microbore within the connector element.

13. A selective catalytic reduction system as claimed in claim 1, further comprising a further coolant passage, the coolant passage being in fluid communication with a coolant inlet port on the pump assembly for receiving cooling fluid and the further coolant passage being in fluid communication with a coolant outlet port for cooling fluid leaving the pump assembly.

14. A selective catalytic reduction system as claimed in claim 13, wherein each of said coolant passage and said further coolant passage comprises a microbore within the connector element.

15. A selective catalytic reduction system as claimed in claim 12, wherein the reagent flow passage comprises a microbore and wherein the microbore of the reagent flow passage and the microbore within the coolant passage within the connector element is formed into an L shape.

16. A selective catalytic reduction system as claimed in claim 15, wherein the connector element defines an axis (X) and the L shaped microbores are arranged such that fluid flow between the connector element and the pump assembly is perpendicular to the connector axis and wherein fluid flow from the reagent supply is in a direction parallel to the connector axis and fluid flow from a coolant supply to a coolant drain is in a direction parallel to the connector axis.

17. A selective catalytic reduction system as claimed in claim 1, wherein the connector element is formed from a block of cuboidal shape, the reagent passage and coolant passage being formed as drillings through the block.

* * * * *